United States Patent [19]

Oppendahl

[11] Patent Number: 5,008,954
[45] Date of Patent: Apr. 16, 1991

[54] VOICE-ACTIVATED RADIO TRANSCEIVER

[76] Inventor: Carl Oppendahl, 27 W. 44th St., #28, New York, N.Y. 10035-6645

[21] Appl. No.: 587,602

[22] Filed: Sep. 24, 1990

Related U.S. Application Data

[63] Continuation of Ser. No. 334,190, Apr. 6, 1989.

[51] Int. Cl.$^5$ .............................................. H04B 1/44
[52] U.S. Cl. ........................................ 455/79; 455/89
[58] Field of Search ...................... 455/78, 79, 82, 84; 379/389, 390, 406, 407, 409

[56] References Cited

U.S. PATENT DOCUMENTS 4,833,452  5/1989  Currier ................................. 455/79

Primary Examiner—Reinhard J. Eisenzopf
Assistant Examiner—Edward Urban

[57] ABSTRACT

An improved VOX-activated transceiver has a signal generator provided in conjunction with the VOX circuitry to provide audio tones through the earphone of the transceiver to announce the transition to transmit mode, or the transition out of transmit mode, or both. By listening for the tones, the user can be continuously apprised of the status of the transceiver. An open mike condition (continuous transmission due to continuous microphone signal in excess of the VOX threshold) is noted, for example, because the user whose transceiver has the open mike will fail to hear the expected tone at the beginning or ending of the user's spoken words. Loss of battery power is likewise noted because the user will fail to hear the expected tone at the beginning or ending of the user's spoken words. Finally, in transceivers having the feature that the VOX circuit is disabled for the duration of receipt of a signal above the squelch threshold, any resulting transmit starvation will be immediately apparent because the user will fail to hear the expected tone at the beginning or ending of the user's spoken words.

8 Claims, 1 Drawing Sheet

VOICE-ACTIVATED RADIO TRANSCEIVER

This application is a continuation of application Ser. No. 334,190, filed on Apr. 6, 1989.

The present invention relates to an improved radio transceiver, and particularly to an improved voice-activated radio transceiver.

BACKGROUND OF THE INVENTION

An essential part of any radio transceiver is the arrangement for switching between transmit and receive modes. With many transceivers, including most amateur and citizens' band radios, the switching into transmit mode is accomplished by the user pressing a "transmit" button. Such an arrangement, called "push-to-talk", gives the user an unequivocal indication of whether the transceiver is in transmit mode or receive mode. If the button is pressed, the transceiver is in transmit mode, and upon the release of the button, the transceiver goes into receive mode.

Another technique for controlling the switching of a transceiver between receive and transmit modes, instead of using a push-to-talk button, is the use of voice actuation. This technique, called "VOX", used circuitry to monitor the signal level from the microphone. When the signal level exceeds a predetermined threshold, the transceiver switches to transmit mode. Later, the signal level will be found to have dropped below a threshold (which may or may not be the same as the previously mentioned threshold), and when the below-threshold condition persists for longer than a predetermined interval, the transceiver switches back to receive mode. The usual (or at least the desired) result when VOX is employed is that the transceiver switches to transmit mode when the user speaks, and returns to receive mode after the user has finished speaking.

While VOX operation has the advantage that the use can be handsfree, that is, that one need not have one's hands free for pressing the PTT button, it can also have disadvantages.

One disadvantage relates to the user's potential inability to recognize an "open mike" condition. For example, the transmit threshold appropriate for one situation, such as a quiet room, may be inappropriate for another, such as a noisy room. Where the ambient noise level is high, the ambient noise by itself, reaching the microphone, may reach the transmit threshold and cause the transceiver to enter transmit mode. This will result in unwanted transmission of the modulated carrier, which at the very least has the drawback of needlessly consuming power from the power supply, typically a battery. The unwanted transmission has the further drawback of filling the channel and thus interfering with other transceivers that would transmit on the channel. Finally, there is the problem that information not intended for transmission may be transmitted anyway.

Where the communications channel is full duplex (e.g. one channel is used for transmit and another for receive) the abovementioned problems of unnecessary power consumption, domination of the transmission channel, and unwanted transmission of information may arise. With many transceivers, however, the communications channel is not full duplex, that is, a single channel is used both for transmission and reception. With such transceivers, each of the transceivers transmits on that channel and each of the transceivers (when not in transmit mode) monitors that channel for receiving information. If and when a particular VOX-type transceiver of this type gets "stuck" in transmit mode due to a continuing signal in excess of the transmit threshold, there is the further problem that for the duration of the "stuck" transmit interval, the user of that transceiver will be unable to hear anything from other transceivers because the transceiver hearing signals from other transceivers requires that the transceiver not be in transmit mode.

Another drawback of VOX operation is that the user may not be aware of the battery having run down, other than by noting the prolonged absence of an audible signal in the earphone.

Yet another drawback of VOX transmission switching is evident, as discussed below, in the case of certain transceivers having a combined microphone and earphone. Such a transceiver picks up the user's speech by conduction through the earphone, and offers the feature that there is no requirement of a microphone positioned at or near the mouth. Another feature of such a microphone arrangement is that it may be less susceptible to ambient noise than a microphone of the type that receives air-transmitted sound energy from a position near the mouth. A VOX-equipped transceiver with combined microphone and earphone offers a handsfree, unobtrusive communications capability.

But in a transceiver having combined microphone and earphone, design consideration must be given to the problems that might arise due to close proximity of the microphone and earphone. It would be undesirable, for example, if received signals provided to the user through the earphone were picked up by the microphone, thus triggering a change to transmit mode. One way to avoid that difficulty is to provide a "squelch" circuit on the receiver, so that only received signals exceeding a set threshold are passed to the earphone. Signals that are fainter than the threshold are "squelched", i.e. are not provided to the audio amplifier that drives the earphone. The transceiver thus has two modes, often termed "quiet mode" (during which the receiver is active but is not providing a signal to the earphone) and "receive mode" (during which the squelch threshold has been exceeded and a signal is being provided to the earphone). The transceiver is configured so that the VOX circuit (which monitors the signal level at the microphone) is only enabled in quiet mode. Stated in the converse, the VOX circuit is disabled whenever the received signal exceeds the squelch threshold.

In a transceiver of the type just described, the reliance on VOX actuation thus has the severe drawback that there can be "transmit starvation". During the entire time that a strong signal (in excess of the squelch threshold) is being received, the user will not be able to cause the transceiver to switch to transmit mode by talking. This occurs because the VOX circuit is disabled when a received signal exceeds the squelch threshold.

The drawback of "transmit starvation" is exacerbated by the problem that the user may not be aware that talking is not accomplishing the switch to transmit mode. As mentioned above, when a PTT button is pushed, there is an unambiguous indication that the transceiver is in transmit mode. But in VOX mode, there will generally be no indication of a successful voice-activated switch to transmit mode, and thus no clue that an attempt to switch to transmit mode was unsuccessful.

The combined result of the abovedescribed drawbacks is that communication between two users can be frustrating if both are using VOX transceivers with combined microphone and earphone. One user may happen to cause an open mike condition, due to (say) allowing headgear to rub against the microphone/earphone and continuously exceeding the VOX threshold. The other user will be unable to transmit because the received signal, continuously exceeding the squelch threshold, will disable the VOX circuit for that user. In typical hands-free applications, such as skiing, bicycling, and the like, the transceiver is in a pocket or pack, so that even if there are indicator lights showing the modes (receive, quiet, and transmit) the users will not be able to see them. Thus the first user will be unaware that she is causing the open mike condition, and the second user will be unaware that her spoken words are not being received by the first user.

It is an object of the present invention to provide an improved transceiver in which users are unlikely to unknowingly cause "open mike" conditions. It is a further object of the invention to provide an improved transceiver in which a user will become immediately aware of the condition if unable to transmit. It is yet another object of the invention to provide an improved transceiver in which the user will more promptly learn of loss of battery power.

SUMMARY OF THE INVENTION

In the improved transceiver of the invention, signal means are provided in conjunction with VOX circuitry to provide audio signals, typically tones, through the earphone of the transceiver to announce the transition to transmit mode, or the transition out of transmit mode, or both. By listening for the tones, the user can be continuously apprised of the status of the transceiver. An open mike condition (continuous transmission due to continuous microphone signal in excess of the VOX threshold) is noted, for example, because the user whose transceiver has the open mike will fail to hear the expected tone at the beginning or ending of the user's spoken words. Loss of battery power is likewise noted because the user will fail to hear the expected tone at the beginning or ending of the user's spoken words. Finally, in transceivers having the feature that the VOX circuit is disabled for the duration of receipt of a signal above the squelch threshold, any resulting transmit starvation will be immediately apparent because the user will fail to hear the expected tone at the beginning or ending of the user's spoken words.

DESCRIPTION OF THE DRAWINGS

The invention will be disclosed with reference to a drawing, in which.

DETAILED DESCRIPTION OF THE INVENTION

Figure 1:
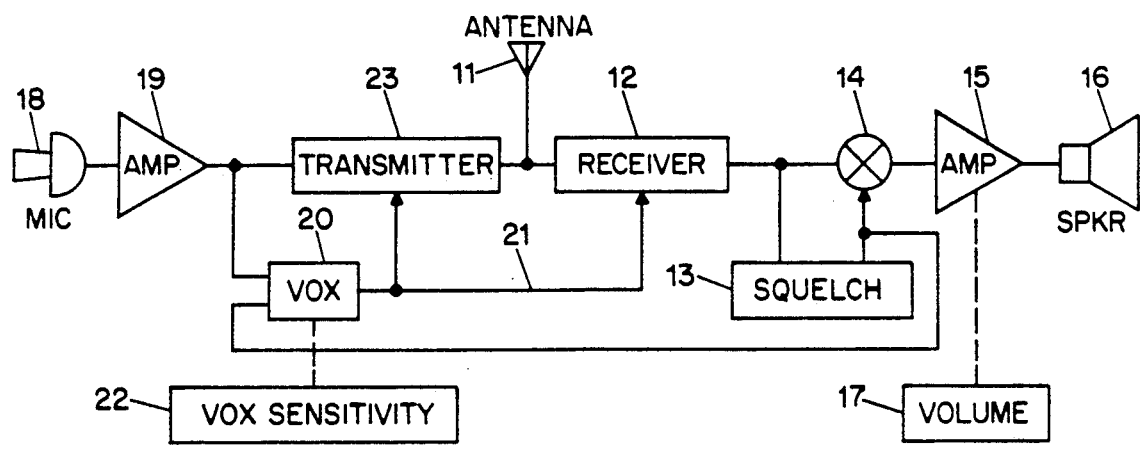
FIG. 1 shows a functional block diagram of a VOX-operated transceiver according to the prior art.

FIG. 1 shows a functional block diagram of a VOX-operated transceiver, of which a typical example is the Radio Shack cat. no. 21-404 transceiver. In such a transceiver, received signals from the antenna go to the receiver 12, and the signal level received at the receiver is provided to a squelch circuit 13. At such time as the signal level exceeds the squelch threshold, the squelch circuit 13 provides a gating signal to switch 14 and to VOX circuitry as discussed below. Presence of the gating signal turns on switch 14, providing the received audio signal to amplifier 15 and thus to the speaker 16. The volume level provided at the speaker 16 is adjustable by the user through volume control 17.

Speech or other audio present at the microphone 18 is amplified by amplifier 19. The VOX circuit 20 monitors the output of amplifier 19 and (if not disabled by the squelch gating signal) will generate a transmit control signal at line 21 when the output of amplifier 19 exceeds the VOX threshold. The VOX threshold may be adjusted by the user by VOX sensitivity control 22.

The transmit control signal, when asserted, disables receiver 12 and enables transmitter 23. Though not shown explicitly in the figure, some circuitry, such as the RF oscillator, may be shared between the transmitter and receiver. The transmitter and receiver typically operate at 49 Mhz on one of the channels authorized by the Federal Communications Commission for unlicensed, low-power communications. The power supply and on/off switch are not shown, nor are optional push-to-talk arrangements. The circuit designs and physical layout of components required for such transmitters and receivers are well known. The amplifiers 19 and 15 are old, as are the VOX 20 and squelch 13 circuits.

Figure 2:
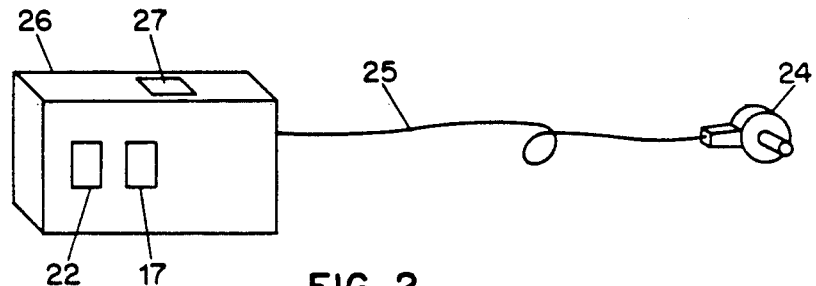
FIG. 2 shows a perspective external view of a typical VOX-operated transceiver with combined microphone and earphone.

A typical commercially available transceiver is shown in an external view in FIG. 2. Microphone 18 and speaker 16 are both contained within earpiece 24; the microphone 18 is preferably of the electret-condenser type due to its small size and weight. A flexible cord 25 carries shielded signals to the microphone and speaker of earpiece 24. The shield of cord 25 acts as an antenna as well. Case 26 contains the balance of the transceiver, and permits user access to VOX sensitivity control 22 and volume control 17, as well as to on/off switch 27.

Figure 3:
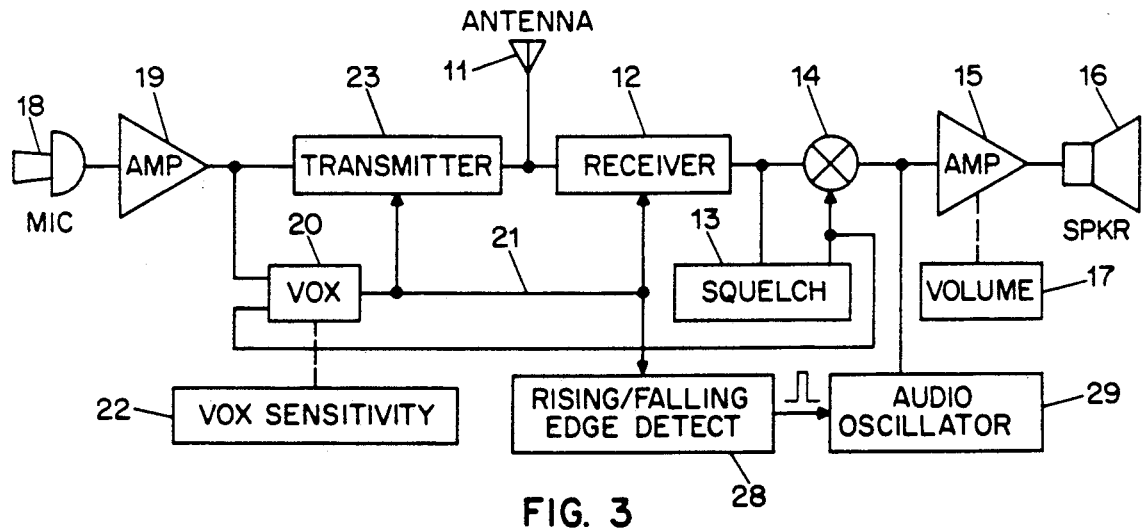
FIG. 3 shows a functional block diagram of an improved VOX-operated transceiver according to the invention, including a rising/falling edge detect circuit.

In the improved transceiver of the invention, a rising-/falling edge detect circuit and audio oscillator are provided as shown in FIG. 3, providing the beneficial features of the invention.

The function of the transceiver in receive mode is as described above in connection with the prior art transceiver, with received signals from antenna 11 detected and amplified by receiver 12 and supplied to squelch circuit 13 and to switch 14, and thence to amplifier 15 and speaker 16.

The function of the transceiver with respect to speech or other audio inputs to microphone 18 is largely as described above, insofar as the inputs are amplified by amplifier 19 and provided to transmitter 23 and antenna 11. However, the transmit control signal 21 is provided not only to transmitter 23 and receiver 12 but also to rising/falling edge detector 28. Upon detection of a rising or falling edge, the detector 28 sends an enabling pulse to audio oscillator 29. The output of audio oscillator 29 goes to amplifier 15 and thence to the speaker 16, thus alerting the user of a transition to transmit mode or out of transmit mode.

Figure 4:
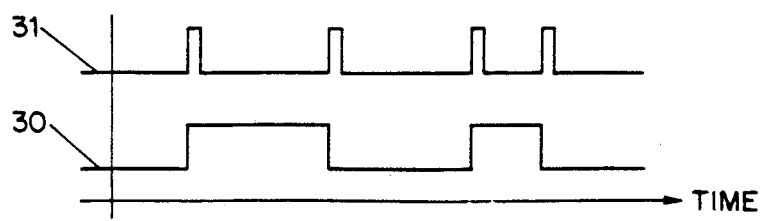
FIG. 4 shows the inputs and outputs of the rising/falling edge detect circuit.

FIG. 4 shows in greater detail the input and output signals of detector 28. Its input shown by line 30 is the transmit control signal 21. Its output shown by line 31 is the enabling signal to audio oscillator 29. Each transition of line 30 gives rise within the detector 28 to a pulse of predetermined width as shown by line 31.

The output of audio oscillator 29 is shown as connected directly to the input of amplifier 15, but depending on the output characteristics of switch 14 and the input characteristics of amplifier 15 the connection may preferably be capacitively coupled or coupled through a switch that is controlled by the enabling output of detector 28.

The audio tone provided at speaker 16 in response to the transition into or out of VOX mode is preferably quite brief in duration, on the order of a few milliseconds. Brevity of the tone minimizes its intrusiveness when generated as the user starts talking. Furthermore, if the microphone is integrally mounted with the earphone, care must be taken that the tone annunciating the transition out of transmit mode does not itself trigger the VOX circuit back into transmit mode. The typical VOX circuit goes into transmit mode only after the above-threshold input has remained above the threshold for some time, at least a few tens of milliseconds. Keeping the tone quite brief will thus keep it from triggering a spurious transition into transmit mode.

Another way to keep the end-of-transmit mode tone from retriggering the VOX circuit is to put a switch in the audio path between amplifier 19 and VOX circuit 20, with the switch controlled by the output of detector 28, so that the microphone is disabled during the brief time the tone is present.

Many users of VOX equipment develop the habit of prefacing each instance of speech with "ahhh" or some other sound to trigger the VOX prior to the time the words are actually spoken; this reduces the problem of the user's first syllable being cut off due to less-than-instant VOX switching. Such users are unlikely to mind the start-of-transmission alerting tone. But for those who find the start-of-transmission alerting tone distracting or annoying, it may be preferable to configure detector 28 only to generating its enabling pulse at the end of transmission. For other users, the end-of-transmission pulse may be the most distracting, and it may be preferable to configure detector 28 only to generating its enabling pulse at the beginning of transmission.

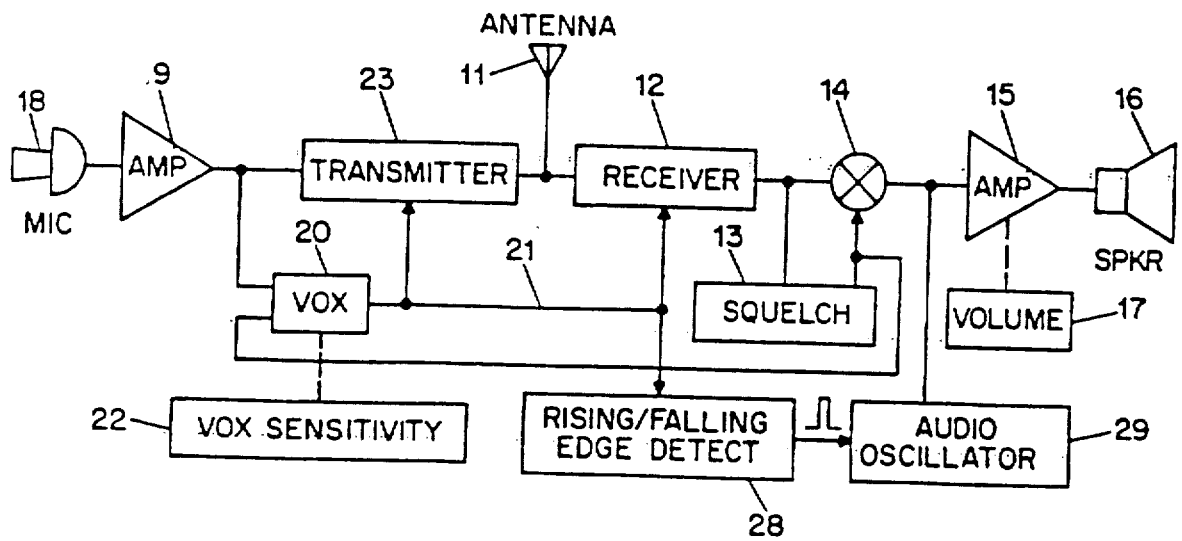

I claim:

1. In a transceiver of the type having a transmit mode, a receive mode, and a squelched mode, and wherein the transceiver enters receive mode upon receipt of a signal having a strength greater than a predetermined squelch threshold, and wherein the transceiver enters transmit mode by voice activation of a voice activation means having a triggering time, and wherein the audio signal received by the receiver portion of the transceiver is conveyed to the user by speaker means, the improvement wherein is provided:

sound pulse generation means responsive to the voice activation for generating a momentary alerting sound audible to the user and conveyed to the user by the speaker means, said sound pulse generation means generating the momentary alerting sound at about the time when the transceiver enters transmit mode, the duration of said momentary alerting sound being less than the triggering time of the voice activation means, whereby the user is alerted that the transceiver has entered transmit mode, and whereby the user will be made aware of loss of power or of spurious continuous transmission.

2. The transceiver of claim 1 wherein the transceiver has a microphone and the microphone is integrally mounted with the speaker means.

3. In a transceiver of the type having a transmit mode, a receive mode, and a squelched mode, and wherein the transceiver enters receive mode upon receipt of a signal having a strength greater than a predetermined squelch threshold, and wherein the transceiver enters transmit mode by voice activation of a voice activation means having a triggering time, and wherein the audio signal received by the receiver portion of the transceiver is conveyed to the user by speaker means, the improvement wherein is provided: sound pulse generation means responsive to the voice activation for generating a momentary alerting sound audible to the user and conveyed to the user by the speaker means, said sound pulse generation means generating the momentary alerting sound at about the time when the transceiver leaves transmit mode, the duration of said momentary alerting sound being less than the triggering time of the voice activation means, whereby the user is alerted that the transceiver has left transmit mode, and whereby the user will be made aware of loss of power or of spurious continuous transmission.

4. The transceiver of claim 3 wherein the transceiver has a microphone and the microphone is integrally mounted with the speaker means.

5. In a transceiver of the type having a transmit mode, a receive mode, and a squelched mode, and wherein the transceiver enters receive mode upon receipt of a signal having a strength greater than a predetermined squelch threshold, and wherein the transceivers enters transmit mode by voice activation of a voice activation means, and wherein the audio signal received by the receiver portion of the transceiver is conveyed to the user by speaker means, the improvement wherein is provided:

sound pulse generation means responsive to the voice activation for generating a momentary alerting sound audible to the user and conveyed to the user by the speaker means, said sound pulse generation means generating the momentary alerting sound at about the time when the transceiver enters transmit mode, the sound pulse generation means further comprising means for disabling the voice activation means for the duration of said momentary alerting sound, whereby the user is alerted that the transceiver has entered transmit mode, and whereby the user will be made aware of loss of power or of spurious continuous transmission.

6. The transceiver of claim 5 wherein the transceiver has a microphone and the microphone is integrally mounted with the speaker means.

7. In a transceiver of the type having a transmit mode, a receive mode, and a squelched mode, and wherein the transceiver enters receive mode upon receipt of a signal having a strength greater than a predetermined squelch threshold, and wherein the transceiver enters transmit mode by voice activation of a voice activation means, and wherein the audio signal received by the receiver portion of the transceiver is conveyed to the user by speaker means, the improvement wherein is provided:

sound pulse generation means responsive to the voice activation for generating a momentary alerting sound audible to the user and conveyed to the user by the speaker means, said sound pulse generation means generating the momentary alerting sound at about the time when the transceiver leaves transmit mode, the sound pulse generation means further comprising means for disabling the voice activation means for the duration of said momentary alerting sound, whereby the user is alerted that the transceiver has left transmit mode, and whereby the user will be made aware of loss of power or of spurious continuous transmission.

8. The transceiver of claim 7 wherein the transceiver has a microphone and the microphone is integrally mounted with the speaker means.

* * * * *

UNITED STATES PATENT AND TRADEMARK OFFICE
CERTIFICATE OF CORRECTION

PATENT NO. : 5,008,954

DATED : April 16, 1991

INVENTOR(S) : Oppedahl

It is certified that error appears in the above-identified patent and that said Letters Patent is hereby corrected as shown below:

Title page should be deleted to appear as per attached Title page.

Signed and Sealed this

Sixteenth Day of March, 1993

Attest:

STEPHEN G. KUNIN

*Attesting Officer*     Acting Commissioner of Patents and Trademarks

United States Patent [19]

Oppedahl

[11] Patent Number: 5,008,954
[45] Date of Patent: Apr. 16, 1991

[54] VOICE-ACTIVATED RADIO TRANSCEIVER

[76] Inventor: Carl Oppedahl, 27 W. 44th St., #28, New York, N.Y. 10035-6645

[21] Appl. No.: 587,602

[22] Filed: Sep. 24, 1990

Related U.S. Application Data

[63] Continuation of Ser. No. 334,190, Apr. 6, 1989.

[51] Int. Cl.$^5$ ............................................. H04B 1/44
[52] U.S. Cl. ...................................... 455/79; 455/89
[58] Field of Search .................. 455/78, 79, 82, 84; 379/389, 390, 406, 407, 409

[56] References Cited

U.S. PATENT DOCUMENTS 4,833,452  5/1989  Currier ................................ 455/79

Primary Examiner—Reinhard J. Eisenzopf
Assistant Examiner—Edward Urban

[57] ABSTRACT

An improved VOX-activated transceiver has a signal generator provided in conjunction with the VOX circuitry to provide audio tones through the earphone of the transceiver to announce the transition to transmit mode, or the transition out of transmit mode, or both. By listening for the tones, the user can be continuously apprised of the status of the transceiver. An open mike condition (continuous transmission due to continuous microphone signal in excess of the VOX threshold) is noted, for example, because the user whose transceiver has the open mike will fail to hear the expected tone at the beginning or ending of the user's spoken words. Loss of battery power is likewise noted because the user will fail to hear the expected tone at the beginning or ending of the user's spoken words. Finally, in transceivers having the feature that the VOX circuit is disabled for the duration of receipt of a signal above the squelch threshold, any resulting transmit starvation will be immediately apparent because the user will fail or hear the expected tone at the beginning or ending of the user's spoken words.

8 Claims, 1 Drawing Sheet